US006836143B2

(12) United States Patent
Song

(10) Patent No.: US 6,836,143 B2
(45) Date of Patent: Dec. 28, 2004

(54) SEMINCONDUCTOR INTEGRATED CIRCUIT WITH TERMINATION CIRCUIT

(75) Inventor: Ho-Young Song, Kyunggi-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 5 days.

(21) Appl. No.: 10/340,704

(22) Filed: Jan. 13, 2003

(65) Prior Publication Data

US 2004/0004494 A1 Jan. 8, 2004

(30) Foreign Application Priority Data

Jul. 5, 2002 (KR) .................................. 10-2002-38821

(51) Int. Cl.[7] ....................... H03K 17/16; H03K 19/003
(52) U.S. Cl. ............................. 326/30; 326/82; 326/83; 326/86; 326/87
(58) Field of Search ............................. 326/30, 34, 82, 326/83, 86, 87, 90, 91

(56) References Cited

U.S. PATENT DOCUMENTS 6,087,847 A * 7/2000 Mooney et al. ............... 326/30
6,157,206 A    12/2000 Taylor et al.
6,429,679 B1 *  8/2002 Kim et al. ..................... 326/30
6,525,558 B2 *  2/2003 Kim et al. ..................... 326/30
6,642,740 B2 * 11/2003 Kim et al. ..................... 326/30
6,661,250 B2 * 12/2003 Kim et al. ..................... 326/30
2002/0050838 A1 * 5/2002 Kim et al. ..................... 326/30
2002/0063575 A1 * 5/2002 Kim et al. ..................... 326/30
2003/0155945 A1 * 8/2003 Ajit ............................. 326/87

FOREIGN PATENT DOCUMENTS

KR        2002-0021450         3/2002

* cited by examiner

Primary Examiner—Michael Tokar
Assistant Examiner—Khai M. Nguyen
(74) Attorney, Agent, or Firm—Harness, Dickey & Pierce, P.L.C.

(57) ABSTRACT

A semiconductor integrated circuit device which includes a termination circuit for terminating a bus line. An impedance control circuit controls impedance of the termination circuit in accordance with impedance of an external reference resistor, so as to have the same or substantially the same impedance as that of the external reference resistor. A detection circuit detects whether the external reference resistor is electrically connected to the semiconductor integrated circuit, and disables the impedance control circuit based on a detection result.

21 Claims, 5 Drawing Sheets ns priority
SEMINCONDUCTOR INTEGRATED CIRCUIT WITH TERMINATION CIRCUIT

This nonprovisional patent application claims priority upon Korean Patent Application No. 2002-38821, filed on Jul. 5, 2002, the contents of which are herein incorporated by reference in their entirety.

FIELD OF THE INVENTION

The present invention is directed to a semiconductor integrated circuit device, and, in particular, a semiconductor integrated circuit device including a termination circuit for terminating a bus.

BACKGROUND OF THE INVENTION

As is well known, a bus used for signal transmission between different integrated circuit devices (e.g., one or more microprocessors, one or more chipsets, one or more memory controllers, one or more memories, one or more graphic controllers, etc.,) may be terminated through a termination resistor, which aids in the suppression of signal reflection as a result of an integrated circuit device acting as a receiver or transmitter. Signal reflection negatively affects signal integrity. This negative effect is even more evident in an integrated circuit device operating at high-speed. In order to suppress signal reflection as much as possible, a termination resistor may be installed on a bus that is placed at a closest position to the integrated circuit device.

Recently, there has become a greater desire for thinner and smaller non-memory products, such as microprocessors and Application Specific Integrated Circuits (ASICs). As a result of this desire, a ball grid array package, in which external pins are arranged at its bottom, has become a popular semiconductor package. A ball grid array type of a semiconductor integrated circuit package normally accepts Pin Grid Array (PGA) and flip chip concepts and reduces a space occupied by the semiconductor package as compared with a conventional Quad Flat Package (QFP). The ball grid array type of a semiconductor integrated circuit package also improves electric and thermal capacities and is more economical for multi-pin structures over 300 pins.

External terminals arranged at the package bottom may be electrically connected to bus lines. When the bus lines are terminated, external terminals that are arranged adjacent to the center of the package are arranged a relatively long distance from corresponding termination resistors as compared with external terminals that are arranged adjacent to edges of the package. Namely, a remaining bus line exists between an external terminal at a package center and a corresponding termination resistor. This arrangement results in signal reflection.

An example of an on-die termination structure is disclosed in U.S. Pat. No. 6,157,206 entitled "ON-CHIP TERMINATION". A semiconductor integrated circuit device disclosed in the '206 patent includes an on-chip input buffer, a termination circuit, and an impedance control circuit. The termination circuit is included in the device and terminates a bus line connected to the input buffer. The impedance control circuit is connected to an external reference resistor, and controls impedance of the termination circuit so as to have the same value as the impedance of the external reference resistor.

In a case where a semiconductor integrated circuit device including an on-die termination circuit is mounted on a board where a bus is terminated, the on-die termination and impedance control circuits of the device may be controlled so as to be disabled. For example, the termination and impedance control circuits are disabled by applying an external command to the integrated circuit device via a separately provided pin or by programming a mode set circuit in the integrated circuit device. If the on-die termination and impedance control circuits of the integrated circuit device operate as described above, power may be unnecessarily consumed by the termination and impedance control circuit.

Although the '206 patent describes "on-chip termination", similar problems may occur in "active termination" and "on-die termination" arrangements.

SUMMARY OF THE INVENTION

In an exemplary embodiment, the present invention is directed to a semiconductor integrated circuit device which is capable of reducing power consumption due to an impedance control circuit, without a separate pin or external command.

In another exemplary embodiment, the present invention is directed to a semiconductor integrated circuit device which is capable of controlling an operation of an impedance control circuit based on a connection state of an external reference resistor, without a separate pin or external command. In accordance with an exemplary embodiment, the present invention, is directed to a semiconductor integrated circuit that includes a termination circuit for terminating a bus line, an impedance control circuit for controlling an impedance of the termination circuit depending on an impedance of an external reference resistance, so as to have the same or substantially the same impedance as that of the external reference resistance, and a detection circuit for detecting whether the external reference resistance is electrically connected to the semiconductor integrated circuit and disabling the impedance control circuit depending on a detection result.

In another exemplary embodiment, the termination circuit is disabled when the impedance control circuit is disabled. The detection circuit is electrically connected to the external reference resistor, and activates a control signal for disabling the impedance control circuit when the external reference resistor is disconnected from the semiconductor integrated circuit.

In another exemplary embodiment, the impedance control circuit generates an impedance control code, which indicates an impedance value of the external reference resistor, depending on the impedance of the external reference resistor.

In another exemplary embodiment, the detection circuit activates a control signal for disabling the impedance control circuit when the impedance control code indicates that the external reference resistor is disconnected from the semiconductor integrated circuit.

In another exemplary embodiment, the present invention is directed to a detection circuit including a connection to a bonding pad of a semiconductor integrated circuit, and a circuit for detecting whether a reference resistance, external to the semiconductor integrated circuit, is electrically connected to the semiconductor integrated circuit and disabling an impedance control circuit of the semiconductor integrated circuit depending on a detection result.

In another exemplary embodiment, the circuit includes a reference current source, a current mirror connected to the reference current source and the bonding pad, and a comparator for comparing a voltage of the bonding pad with a reference voltage, the comparator generating a control signal for disabling impedance control circuit when the voltage of the bonding pad is higher than the reference voltage.

In another exemplary embodiment, the circuit includes an OR gate for receiving an impedance control signal from the impedance control circuit and outputting a disable signal.

BRIEF DESCRIPTION OF THE DRAWINGS

A more complete appreciation of the present invention, and many of the attendant advantages thereof, will become readily apparent as the same becomes better understood by reference to the following detailed description when considered in conjuction with the accompanying drawings in which like reference symbols indicate the same or similar components, wherein.

DESCRIPTION OF EXEMPLARY EMBODIMENTS OF THE PRESENT INVENTION

Exemplary embodiments of the present invention will be more fully described with reference to the attached drawings.

Figure 1:
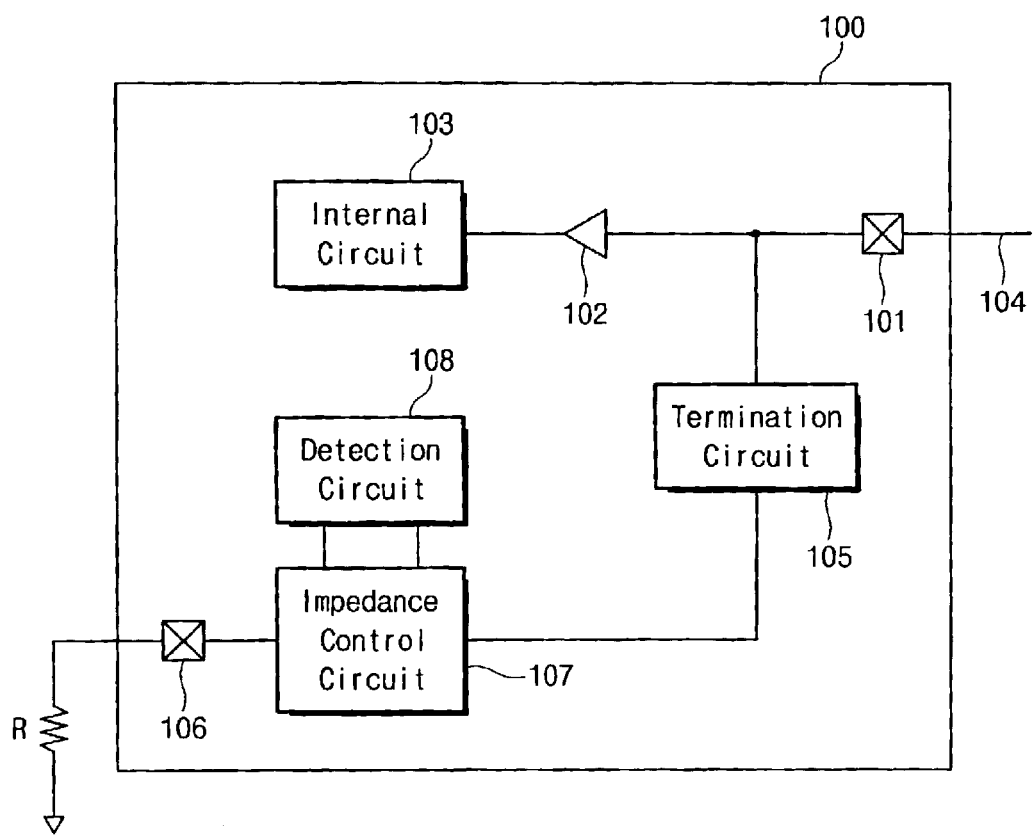
FIG. 1 is a block diagram of a semiconductor integrated circuit device according to an exemplary embodiment of the present invention.

FIG. 1 is a block diagram of a semiconductor integrated circuit device according to an exemplary embodiment of the present invention. Referring to FIG. 1, a semiconductor integrated circuit device 100 of an exemplary embodiment of the present invention includes a first bonding pad 101, a receiver 102, an internal circuit 103, and a termination circuit 105. The bonding pad 101 is electrically connected to a bus line 104 for transmitting a signal. The receiver 102 is connected to the bonding pad 101. The receiver 102 receives a signal input via the bonding pad 101 and transfers the received signal to the internal circuit 103. The termination circuit 105 is connected to the first bonding pad 101 so as to terminate the bus line 104. Although not shown in FIG. 1, it is understood to one or ordinary skill in the art that other receivers 102, each connected to a corresponding bonding pad or pads 101, may also be provided. It is further understood to one or ordinary skill in the art that one or more termination circuits 105 may be connected to each of the respective bonding pads 101.

The exemplary semiconductor integrated circuit device 100 of FIG. 1 may further include a second bonding pad 106, an impedance control circuit 107, and a detection circuit 108. The second bonding pad 106 is connected to an external reference resistor R, and the impedance control circuit 107 is connected to the second bonding pad 106. The impedance control circuit 107 controls an impedance of the termination circuit 105 so as to have the same or substantially the same value as the impedance of the external reference resistor R, and the termination circuit 105 terminates the bus line 104. The detection circuit 108 detects whether the external reference resistor R is electrically connected to the second bonding pad 106 of the semiconductor integrated circuit device 100 and disables the impedance control circuit 107 based on a detection result.

With this control technique, the detection circuit 108 may detect whether the external reference resistor R is connected to the bonding pad 106. When the external reference resistor R is not connected to the bonding pad 106, the detection circuit 108 disables the impedance control circuit 107, thereby reducing or preventing unnecessary power consumption by the impedance control circuit 107 when the external reference resistor R is not connected to the bonding pad 106.

Figure 2A:
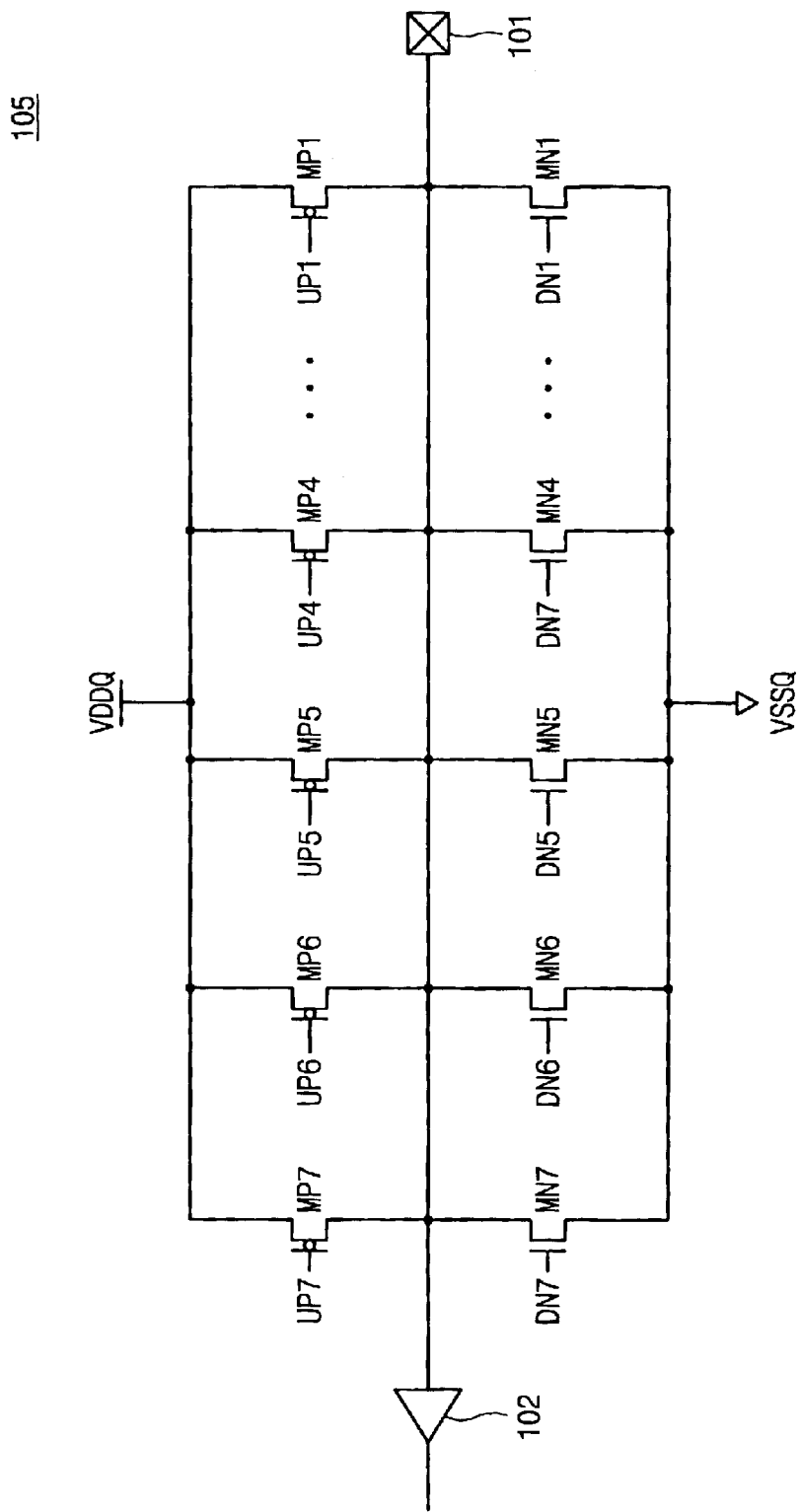
FIG. 2A is an exemplary embodiment of the termination circuit illustrated in FIG. 1.
Figure 2B:
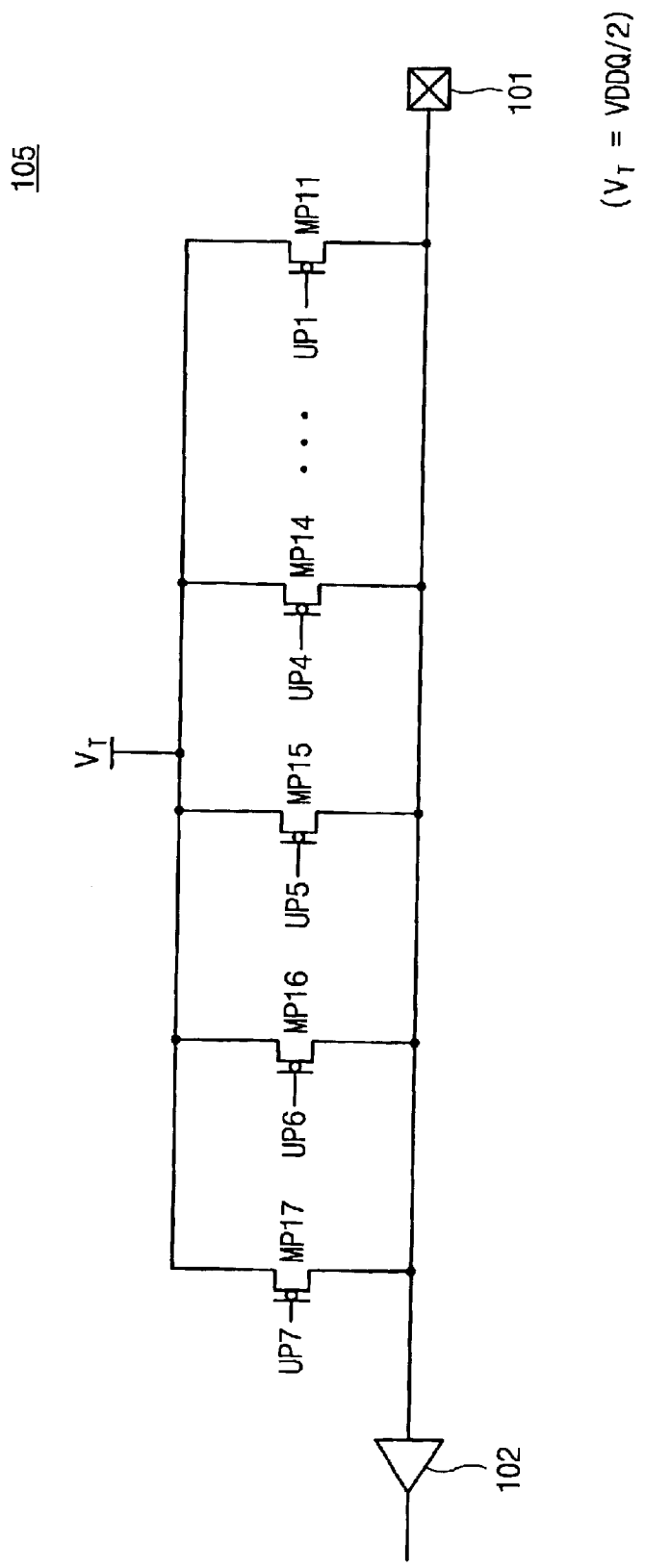
FIG. 2B is another exemplary embodiment of the termination circuit illustrated in FIG. 1.

FIGS. 2A and 2B are circuit diagrams showing exemplary embodiments of the termination circuit illustrated in FIG. 1. Referring to FIG. 2A, the termination circuit 105 includes a plurality of PMOS transistors MP1–MPn (where n is a integer, for example, 7 in the exemplary embodiment of FIG. 2A) connected in parallel between a power supply voltage VDDQ and the first bonding pad 101, and a plurality of NMOS transistors MN1–MNm (where m is a integer, for example, 7 in the exemplary embodiment of FIG. 2A) connected in parallel between the first bonding pad 101 and a ground voltage VSSQ. The PMOS transistors MP1–MPn are controlled by corresponding impedance control signals UP1–UPn, respectively, and the NMOS transistors MN1–MNm are controlled by corresponding impedance control signals DN1–DNm, respectively.

The impedance control signals UP1–UPn and DN1–DNm are provided from the impedance control circuit 107 illustrated in FIG. 1. The PMOS transistors MP1–MPn are selectively turned on/off according to selective activation of the impedance control signals UP1–UPn. Likewise, the NMOS transistors MN1–MNm are selectively turned on/off according to selective activation of the impedance control signals DN1–DNm. This means that the impedance of the exemplary termination circuit 105 of FIG. 2A is variable and the termination circuit 105 operates as a variable impedance circuit.

Another exemplary embodiment of the termination circuit 105, as illustrated in FIG. 2B, is formed of PMOS transistors MP11–MPx (where x is a integer, for example, 7 in the exemplary embodiment of FIG. 2B) that are connected in parallel between a termination voltage $V_T$ (VDDQ/2) and the first bonding pad 101. The PMOS transistors MP11–MPx are controlled by corresponding impedance control signals UP1–UPx, respectively. The impedance control signals UP1–UPx are provided from the impedance control circuit 107 which is illustrated in FIG. 1. The PMOS transistors MP11–MPx are selectively turned on/off depending upon selective activation of the impedance control signals UP1–UPx. This means that impedance of the exemplary termination circuit 105 of FIG. 2B is variable and the termination circuit 105 operates as a variable impedance circuit.

Figure 3:
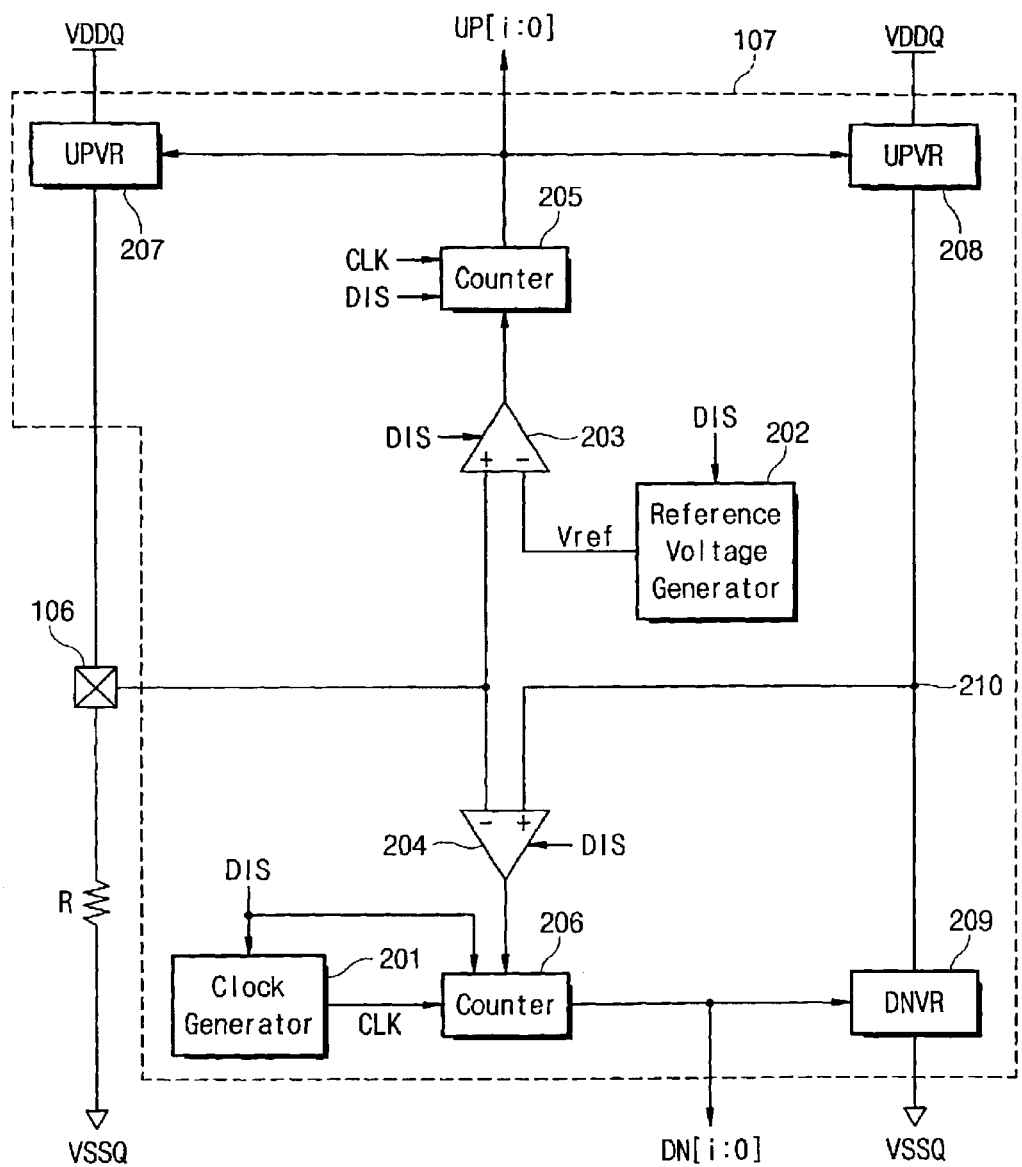
FIG. 3 is an exemplary embodiment of the impedance control circuit illustrated in FIG. 1.

FIG. 3 illustrates an impedance control circuit 107 according to an exemplary embodiment of the present invention. Referring to FIG. 3, the impedance control circuit 107 includes a clock generator 201, a reference voltage generator 202, one or more voltage generators 203 and 204, one or more counters 205 and 206, and one or more variable impedance circuits 207, 208, and 209.

The clock generator 201 generates a clock signal CLK that has a given period and is supplied to the one or more counters 205 and 206. The comparator 203 detects whether a voltage on the bonding pad 106 is higher in level than a reference voltage Vref (VDDQ/2) from the reference voltage generator 202. Counter 205 generates impedance control signals UP1–UP(n or x), as an impedance control code, in response to an output of the comparator 203. The impedance of the one or more variable impedance circuits 207 and 208 is controlled by the impedance control signals UP1-UP(n or x) from the counter 205. Likewise, the impedance of a termination circuit 105 in FIG. 1 is controlled by the impedance control signals UP1–UP(n or x) from the counter 205. Namely, the impedance control signals UP1–UP(n or x) are used to control corresponding PMOS transistors MP1–MPn of the termination circuit 105 in FIG. 2A or PMOS transistors MP1–MPx of the termination circuit 105 in FIG. 2B. The above-described operations may be repeated until the voltage on the bonding pad 106 is equal or substantially equal to the reference voltage Vref, that is, VDDQ/2.

The comparator 204 may also detect whether a voltage on an internal node 210 is higher in level than a voltage on the bonding pad 106. The counter 206 may generate impedance control signals DN1–DNm, as an impedance control code, in response to an output of the comparator 204. The impedance of the variable impedance circuit 209 may be controlled by impedance control signals DN1–DNm from the counter 206. The above-described operations may also be repeated until the voltage on the node 210 is equal or substantially equal to the voltage on the bonding pad 106, that is, VDDQ/2. The impedance control signals DN1–DNm may be used to control corresponding NMOS transistors MN1–MNm of a termination circuit 105 in FIG. 2B.

In an exemplary embodiment, each of the counters 205 and 206 is a 7-bit up/down counter. When the termination circuit 105 in FIG. 2B is used, the impedance control circuit 107 according to an exemplary of the present invention may be formed of a clock generator 201, a reference voltage generator 202, a comparator 203, a counter 205, and a variable impedance circuit 207.

As set forth above, the detection circuit 108 disables the impedance control circuit 107 when the external reference resistor R is not connected to the bonding pad 106. This can be accomplished by disabling the clock generator 201, the reference voltage generator 202, the comparators 203 and 204, and the counters 204 and 205 with a control signal DIS from the detection circuit 108, as illustrated in FIG. 3. When the counters 205 and 206 are disabled, the variable impedance circuit 207, 208, and 209 as well as the termination circuit 105 are also disabled. Thus, it is possible to reduce or prevent unnecessary power consumption of by an impedance control circuit when an external reference resistor is not connected to a bonding pad.

Figure 4:
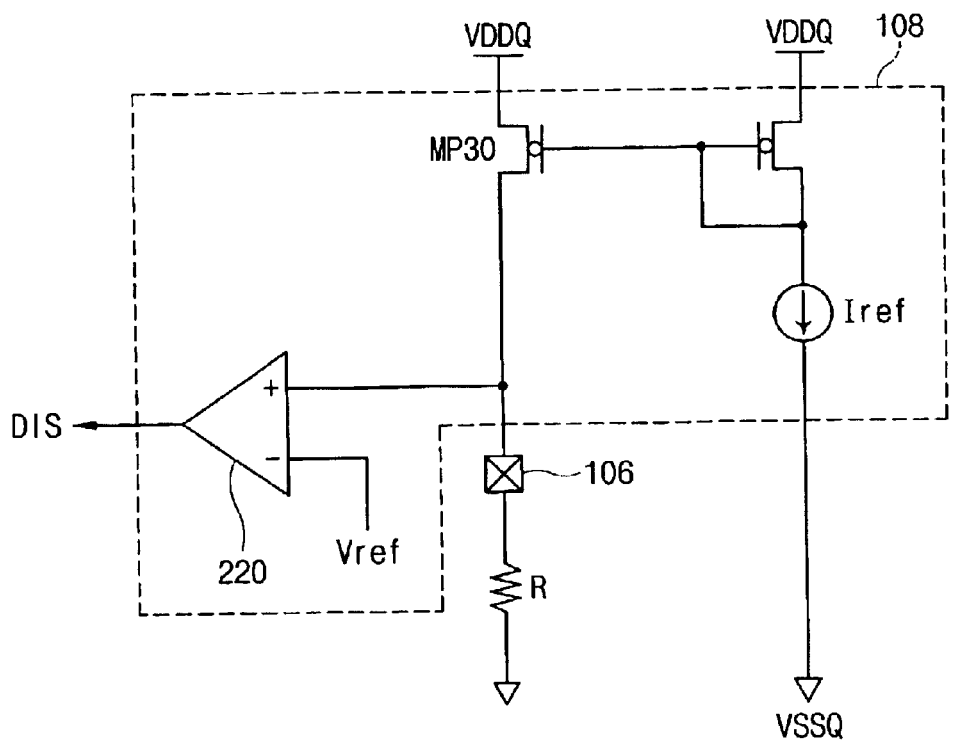
FIG. 4 is an exemplary embodiment of the detection circuit illustrated in FIG. 1.

FIG. 4 illustrates a detection circuit according to an exemplary embodiment of the present invention. Referring to FIG. 4, a detection circuit 108 of an exemplary of the present invention includes PMOS transistors MP30 and MP31, a current source Iref, and a comparator 220. The PMOS transistors MP30 and MP31 are configured to form a current mirror, and are connected between the current source Iref and a bonding pad 106. A non-inverting terminal of the comparator 220 is connected to the bonding pad 106, and an inverting terminal thereof is connected to receive a reference voltage Vref.

When an external reference resistor R is connected to the bonding pad 106, a voltage of the bonding pad 106 which is obtained using the reference current Iref is lower in level than the reference voltage Vref. When the external reference resistor R is not connected to the bonding pad 106, a voltage of the bonding pad 106 is higher in level than the reference voltage Vref. When a voltage of the bonding pad 106 is higher than the reference voltage Vref or when the external reference resistor R is not connected to the bonding pad 106, the comparator 220 activates the control signal DIS. Accordingly, the impedance control circuit 107 is disabled by activation of the control signal DIS.

Figure 5:
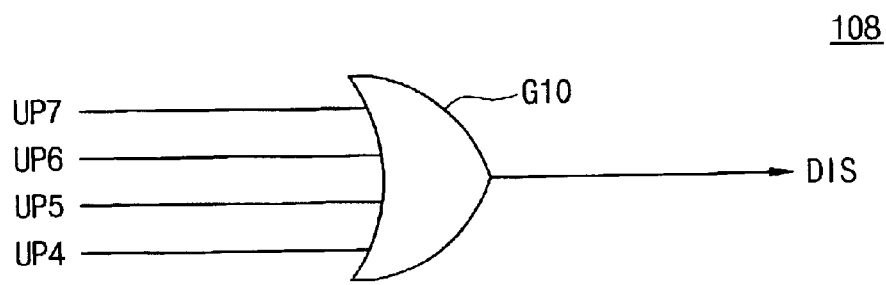
FIG. 5 is another exemplary embodiment of the detection circuit illustrated in FIG. 1.

FIG. 5 illustrates a detection circuit according to another exemplary embodiment of the present invention. Referring to FIG. 5, a detection circuit 108 according to another exemplary embodiment detects whether an external reference resistor R is electrically connected to a bonding pad 106, based on an impedance control code from an impedance control circuit 107. For example, the detection circuit 108 receives most significant bit (MSB) signals UPn–UP (n–3) of impedance control signals UP1–UPn from a counter, such as counter 205 in FIG. 3, and detects whether the external reference resistor R is electrically connected to the bonding pad 106. The detection circuit 108 may be formed of an OR gate G10. When the MSB signals UPn–UP (n–3) all are low or when the external reference resistor R is not connected to the bonding pad 106, the OR gate G10 activates the control signal DIS. The impedance control circuit 107 is disabled according to activation of the control signal DIS.

As set forth above, a detection circuit disables an impedance control circuit when an external reference resistor is not connected to a bonding pad. This means that the impedance control circuit is disabled without a separate pin or external command when the external reference resistor is not connected to the bonding pad. Thus, it is possible to reduce or prevent unnecessary power consumption of the impedance control circuit when the external reference resistor is not connected to the bonding pad.

In exemplary embodiments of the present invention, the termination circuit may be an on-die termination circuit, an on-chip termination circuit, an active termination circuit, or any other termination arrangement known to one of ordinary skill in the art.

In exemplary embodiments of the present invention, the external reference device is an external reference resistor R, but may also be any other equivalent circuit arrangement known to one of ordinary skill in the art.

The invention has been described using exemplary embodiments. However, it is to be understood that the scope of the invention is not limited to the disclosed embodiment. On the contrary, it is intended to cover various modifications and similar arrangements. The scope of the claims, therefore, should be accorded the broadest interpretation so as to encompass all such modifications and similar arrangements.

What is claimed is:

1. A semiconductor integrated circuit comprising:
   a termination circuit for terminating a bus line;
   an impedance control circuit for controlling an impedance of the termination circuit depending on an impedance of an external reference resistance, so as to have the same or substantially the same impedance as that of the external reference resistance; and
   a detection circuit for detecting whether the external reference resistance is electrically connected to the semiconductor integrated circuit and disabling the impedance control circuit depending on a detection result.

2. The semiconductor integrated circuit according to claim 1, wherein the termination circuit is disabled when the impedance control circuit is disabled.

3. The semiconductor integrated circuit according to claim 1, wherein the detection circuit is electrically connected to the external reference resistance, and activates a control signal for disabling the impedance control circuit when the external reference resistance is not connected to the semiconductor integrated circuit.

4. The semiconductor integrated circuit according to claim 1, wherein the impedance control circuit generates an impedance control code, which indicates an impedance value of the external reference resistance, depending on the impedance of the external reference resistance.

5. The semiconductor integrated circuit according to claim 4, wherein the detection circuit activates a control signal for disabling the impedance control circuit when the impedance control code indicates that the external reference resistance is not connected to the semiconductor integrated circuit.

6. The semiconductor integrated circuit according to claim 1, wherein the external reference resistance is an external reference resistor.

7. A semiconductor integrated circuit comprising:
a first pad connected to a bus line;
a second pad connected to an external reference resistance;
a first variable impedance circuit connected between a power supply voltage and the first pad;
a second variable impedance circuit connected between a ground supply voltage and the first pad;
a first comparator for comparing a voltage of the second pad with a reference voltage to output a count signal;
a counter for generating an impedance control signal for controlling impedance of the first and second variable impedance circuits, in response to the count signal; and
a detection circuit connected to the second pad, for detecting whether the external reference resistance is electrically connected to the semiconductor integrated circuit, wherein the detection circuit disables the first comparator and the counter when the external reference resistance is not connected to the semiconductor integrated circuit.

8. The semiconductor integrated circuit according to claim 7, wherein the detection circuit comprises:
a reference current source;
a current mirror connected to the reference current source and the second pad; and
a second comparator for comparing a voltage of the second pad with the reference voltage, the second comparator generating a control signal for disabling the first comparator and the counter when the voltage of the second pad is higher than the second reference voltage.

9. The semiconductor integrated circuit according to claim 8, wherein the first and second variable impedance circuits are disabled when the counter is disabled.

10. The semiconductor integrated circuit according to claim 7, wherein the external reference resistance is an external reference resistor.

11. A semiconductor integrated circuit comprising:
a first pad connected to a bus line;
a second pad connected to an external reference resistor;
a first variable impedance circuit connected between a power supply voltage and the first pad;
a second variable impedance circuit connected between a ground supply voltage and the first pad;
a comparator for comparing a voltage of the second pad with a reference voltage to output a count signal;
a counter for generating an impedance control code for controlling impedance of the first and second variable impedance circuits, in response to the count signal; and
a detection circuit for detecting whether the external reference resistor is electrically connected to the semiconductor integrated circuit, depending on the impedance control code,
wherein the detection circuit disables the first comparator and the counter when the impedance control code indicates that the external reference resistor is not connected to the semiconductor integrated circuit.

12. The semiconductor integrated circuit according to claim 11, wherein the external reference resistance is an external reference resistor.

13. A detection circuit, comprising:
a connection to a bonding pad of a semiconductor integrated circuit; and
a circuit for detecting whether a reference resistance, external to the semiconductor integrated circuit, is electrically connected to the semiconductor integrated circuit and disabling an impedance control circuit of the semiconductor integrated circuit depending on a detection result.

14. The detection circuit according to claim 13, wherein the circuit disables the an impedance control circuit of the semiconductor integrated circuit when the external reference resistance is not connected to the bonding pad.

15. The detection circuit according to claim 13, wherein the circuit disables the an impedance control circuit of the semiconductor integrated circuit when a voltage of the bonding pad is higher than a reference voltage applied to the circuit.

16. The detection circuit according to claim 13, wherein the circuit disables the impedance control circuit of the semiconductor integrated circuit by outputting a disable signal.

17. The detection circuit according to claim 13, wherein the circuit disables the impedance control circuit of the semiconductor integrated circuit.

18. The detection circuit according to claim 13, said circuit including,
a reference current source,
a current mirror connected to the reference current source and the bonding pad, and
a comparator for comparing a voltage of the bonding pad with a reference voltage, the comparator generating a control signal for disabling impedance control circuit when the voltage of the bonding pad is higher than the reference voltage.

19. The detection circuit according to claim 13, said circuit including an OR gate for receiving an impedance control signal from the impedance control circuit and outputting a disable signal.

20. The detection circuit according to claim 13, wherein the external reference resistance is an external reference resistor.

21. The semiconductor integrated circuit including the detection circuit of claim 13.

* * * * *